United States Patent
Gordon et al.

(10) Patent No.: US 9,554,585 B2
(45) Date of Patent: Jan. 31, 2017

(54) FEED BLOCKS AND METHODS OF MAKING AND USING SAME

(75) Inventors: Mary Elizabeth Gordon, Wappingers Falls, NY (US); Kent J. Lanter, Waterloo, IL (US); Michael Jerina, Eureka, MO (US)

(73) Assignee: PURINA ANIMAL NUTRITION LLC, Shoreview, MN (US)

( * ) Notice: Subject to any disclaimer, the term of this patent is extended or adjusted under 35 U.S.C. 154(b) by 1068 days.

(21) Appl. No.: 13/368,238

(22) Filed: Feb. 7, 2012

(65) Prior Publication Data

US 2013/0199451 A1 Aug. 8, 2013

Related U.S. Application Data

(63) Continuation-in-part of application No. 13/365,753, filed on Feb. 3, 2012, now abandoned.

(51) Int. Cl.
*A01K 5/00* (2006.01)

(52) U.S. Cl.
CPC ............... *A23K 50/30* (2016.05); *A23K 10/30* (2016.05); *A23K 10/37* (2016.05); *A23K 20/111* (2016.05); *A23K 20/163* (2016.05); *A23K 20/174* (2016.05); *A23K 20/195* (2016.05); *A23K 20/20* (2016.05); *A23K 40/20* (2016.05); *A23K 50/10* (2016.05); *A23K 50/20* (2016.05); *Y02P 60/877* (2015.11)

(58) Field of Classification Search
CPC .... A01K 5/0114; A01K 39/0106; A23K 1/14; A23K 40/30; A23K 40/20; A23K 10/30; A23K 10/37; A23K 10/32; A23K 50/20; A23K 50/30

USPC ...................................................... 119/51.03
See application file for complete search history.

(56) References Cited

U.S. PATENT DOCUMENTS

| | | |
|---|---|---|
| 4,062,988 A | 12/1977 | DeSantis |
| 4,171,386 A | 10/1979 | Skoch et al. |
| 4,225,621 A | 9/1980 | Lanter et al. |
| 4,631,192 A * | 12/1986 | Mommer et al. ............... 426/69 |
| 4,904,486 A | 2/1990 | Donovan et al. |
| 4,980,184 A | 12/1990 | Dahlgren et al. |

(Continued)

FOREIGN PATENT DOCUMENTS

WO    WO 2008/151233    12/2008

OTHER PUBLICATIONS

Lillico webpage download for Timothy Cubes at http://www.lillicobiotech.co.uk/treats/treats_2nd/timothy_cubes/timothy_cubes.php, Oct. 7, 2011.

(Continued)

*Primary Examiner* — Trinh Nguyen
(74) *Attorney, Agent, or Firm* — Dorsey & Whitney LLP; Bridget M. Hayden, Esq.

(57) ABSTRACT

A feed block is formed of compacted feed components and includes a moisture level of between about 7 and about 15 percent. Feed blocks have an initial weight, which is substantially free of liquid, and liquid is introduced to the feed block to cause the feed block to absorb liquid. A final resulting weight of the feed block is at least 100 percent greater than the initial weight. The feed block with the absorbed liquid is provided the to the livestock animals for the simultaneous ingestion of feed and liquid. Feed blocks are formed by introducing feed components in a high pressure press and compacting the feed components to form the feed block.

14 Claims, 1 Drawing Sheet

(56) References Cited

U.S. PATENT DOCUMENTS

| | | | |
|---|---|---|---|
| 4,994,282 | A | 2/1991 | Miller |
| 5,156,870 | A | 10/1992 | Evans |
| 5,716,655 | A | 2/1998 | Hamstra et al. |
| 5,720,971 | A | 2/1998 | Beauchemin et al. |
| 5,922,343 | A | 7/1999 | Stucker |
| 6,390,024 | B2 | 5/2002 | Robbins |
| 6,561,133 | B2 | 5/2003 | Robbins |

OTHER PUBLICATIONS

"A Healthy Alternative—TMR cubes can be good for horses—and hay growers", Hay & Forage Grower®, downloaded from http://hayandforage.com/hay/healthy_alternative_tmr_0808, Aug. 1, 2008.

* cited by examiner

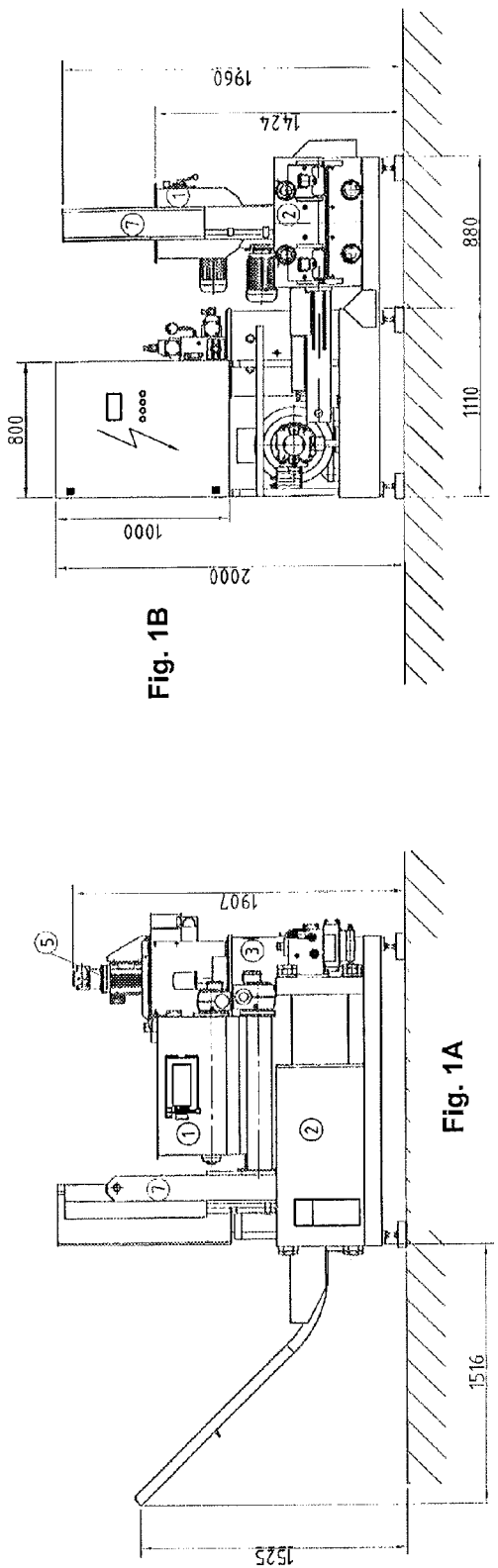
Fig. 1B
Fig. 1A
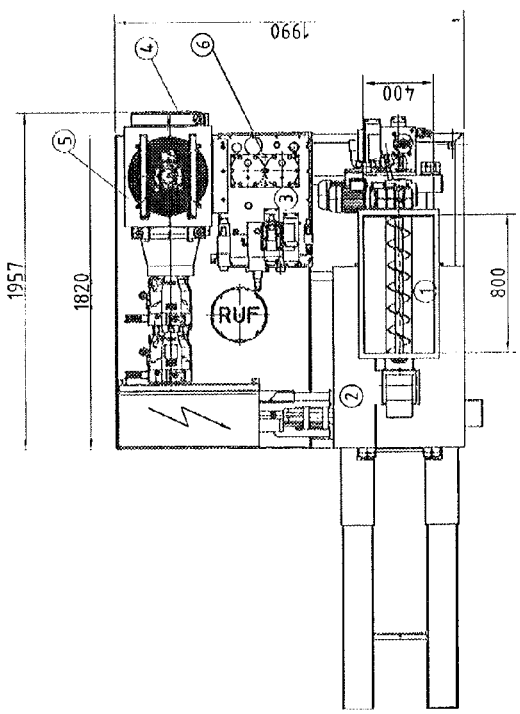
Fig. 1C
1 hopper
2 press part
3 hydraulic oil tank
4 electro motor
5 oil cooler with van
6 oil filter
7 charger

US 9,554,585 B2

FEED BLOCKS AND METHODS OF MAKING AND USING SAME

CROSS-REFERENCE TO RELATED APPLICATION

This application is a continuation-in-part ("CIP") application of U.S. application Ser. No. 13/365,753, filed Feb. 3, 2012, entitled "Feed Blocks and Methods of Making and Using Same," the content of which is herein incorporated by reference in its entirety.

FIELD OF THE INVENTION

Implementations provide feed blocks and methods of making and delivering the feed blocks to livestock animals for providing compact feeding systems that simultaneously deliver nutrients and water to the livestock animal.

BACKGROUND

Livestock animals generally ingest feed and water from separately arranged troughs. Water is generally consumed ad libitum and feed is ingested according to a daily ration. In some settings, such as during transport or when the livestock animals are away from their natural environment, feed and water availability and intake can be problematic. For example, when the livestock animal is transported, water troughs may not hold water due to movements of the trailer causing the water supply to splash and spill out from the trough. This may result in a reduced amount of water available for consumption.

In some cases, when livestock animals experience periods of stress, the livestock animal may reduce its water intake. Periods of stress may be the result of heat, travel or sickness, and a reduced water intake can be problematic for the animal, which may, for example, become further dehydrated or otherwise sick.

Moreover, during travel, the livestock animals require feeding and thus many individuals travel with hay and grain for feeding, which can take up large amounts of space and be difficult to transport when using small trucks for trailering the livestock animal.

SUMMARY

Implementations accordingly provide feed blocks, methods of making the feed blocks, and methods of providing the feed blocks to livestock animals for simultaneous consumption of feed and liquid.

In some implementations, a feed block is formed of compacted feed components that includes at least one feed component for livestock animals with a moisture level of between about 7 and about 15 percent.

In another implementation, a method of feeding a feed block to livestock animals provides a feed block with at least one compacted feed component that in an initial state includes an initial weight and is substantially free of liquid. Liquid is introduced to the feed block and the feed block absorbs the liquid to a final weight that is at least 100 percent greater than the initial weight. The feed block with the absorbed liquid is then provided to the livestock animals.

In some implementations, a feed block may be formed by introducing at least one feed component in a high pressure press and compacting the at least one feed component using the high pressure press to form the feed block.

BRIEF SUMMARY OF THE DRAWINGS

FIG. 1A is a left elevation view of a press that may be used to form the feed blocks provided herein.
FIG. 1B is a front elevation view of the press of FIG. 1A.
FIG. 1C is a top plan view of the press of FIG. 1A.

DETAILED DESCRIPTION

Implementations may solve the problems associated with traveling with large amounts of feed when transporting livestock animals by offering the livestock animal the novel and advantageous feed blocks provided herein. The feed blocks may be compact, dense blocks comprised of one or more feed components. The feed blocks may be formed using a compressor device, such as a press, which may cause the feed components to be compacted and held together. In some implementations, livestock animals may be offered hydrated feed blocks, which enables simultaneous consumption of feed and liquid by the animals, thereby providing an alternative to separately offered feed and water.

Feed blocks are formed of one or more feed components. Some non-limiting examples of feed components that may be included in the feed blocks include: hay (e.g., alfalfa hay, Timothy hay or both); grains (e.g., corn, wheat, milo, soybean meal); feed pellets (e.g., grain mixtures and molasses); nutrients; and flavor enhancers.

The size and shape of feed blocks may be similar to bricks. For example, the feed blocks may have a length of approximately 150 mm to about 260 mm, a width of approximately 60 mm to about 100 mm, and a height of about 40 mm to about 100 mm.

Feed blocks may be formed using the press illustrated in FIGS. 1A-1C, which may be a RUF wood press. The press may include a hopper 1 with a transport system (e.g., a conveyor or a feed screw) that transports feed components such as hay and grass particles and other feed components to an internal press chamber. The feed components may be mixed in the hopper 1, prior to introducing the feed components to the press 2, or both.

When a sufficient amount of the feed components, such as about 2.0 lbs., reaches the internal press chamber of the press 2, the charger 7 operates to compress the volume of the feed components within the press interior (e.g., by operation of the electric motor 4 facilitated by the hydraulic oil tank 3, oil cooler with fan 5, and oil filter 6). The original volume of the feed components within the press interior is therefore reduced to an initial reduced volume. For example, during compression by the charger 7, the press may operate to compress the height of the feed components. Once the charger operates and a predetermined dimension of the compacted feed components is reached, the press part or walls forming the internal press chamber may move together to further compact another dimension (e.g., the length or the width) of the feed components to a final reduced volume that is smaller than the initial reduced volume. During the compression steps, the press may force air from the feed components and from areas surrounding the feed components. The resulting feed block may have a weight of about 2.0 lbs. The feed blocks may have any weight, such as about 1.0 lbs., 2.0 lbs., 3.0 lbs., 4.0 lbs., 5.0 lbs., 10.0 lbs., between about 1.0 and 2.0 lbs., 2.0 and 3.0 lbs., 3.0 and 4.0 lbs., 1.0 and 4.0 pounds, 1.0 and 10.0 pounds and so on.

The feed block may be forced from an extrusion receptacle in a rectangular block shape resembling a brick, e.g., about 150 mm×about 60 mm with a variable third dimension (e.g., length, width or height), or about 260 mm×about 100 mm with a variable third dimension. For example, the third dimension of the feed block may be about 40 mm to about 100 mm. The feed blocks may be stacked and packaged individually or in groups (e.g., groups of 8-15 feed blocks) for dispatch. In some implementations, the feed blocks may be cooled prior to packaging, using for example fans or by exposure to ambient air.

The press for forming the feed blocks may have a production capacity of about 30 kg/h to 1500 kg/h, or between about 150 blocks to about 700 blocks per hour, or between about 400 to about 600 blocks per hour, or about 500 blocks per hour.

Because the feed ration is pressed into feed blocks under pressure, bonding agents may be unnecessary for the feed blocks to retain their shape. However, in some implementations, bonding agents such as molasses may be included in the feed components. In further implementations, while components such as molasses may be considered a bonding agent, the component may serve other functions instead of or in addition to serving as a bonding agent, such as providing flavor enhancement.

The feed block manufacturing process generates feed blocks that generally differ from hay bales or hay rolls due to their compactness. The feed blocks do not require baling twine or wrapping to maintain their shape as is generally the case with hay bales and rolls because compression of the feed components within the press interior causes the feed components to bind together under pressure. In addition, the feed blocks are relatively more compact than hay bales or rolls due to their manufacturing process.

The feed blocks may contain some moisture due to the inherent moisture contained within the feed components. Generally, this amount of moisture is insufficient to deliver an adequate amount of water or liquid to the livestock animal. For example, moisture may be in an amount of about 7 to 15 percent, about 10 to 15 percent, about 12 percent, about 13 percent, about 14 percent of the feed block. Rather, in use, as described below, the feed blocks may be provided to the livestock animal after hydrating the feed blocks with liquid in order to enable the livestock animal to simultaneously ingest feed and liquid.

Hydrating the feed blocks may involve introducing liquids such as water, liquid electrolytes or both by pouring liquid over the feed block or placing the feed block in a container holding liquid to cause the feed blocks to absorb the liquid. During liquid absorption, the feed block may expand and may break apart. The feed blocks with liquid absorbed therein may swell and break apart into a mass of moistened feed components.

In some implementations, the amount of liquid absorbed by the feed blocks may exceed 100 percent, 200 percent, 300 percent, 400 percent, 500 percent, 600 percent, 700 percent or more of the initial weight of the feed block prior to the introduction of liquid (e.g., water). The amount of liquid absorbed may be a function of time the feed block is immersed in the liquid and the longer the feed block is immersed in the liquid, liquid may continue to be absorbed up to a saturation point. In addition, while the feed blocks contain a level of moisture since the feed components inherently contain some moisture (e.g., about 5 to about 15 percent moisture; about 6 to about 12 percent moisture or any integer value between about 5 and 15 percent), an initial weight of the feed block is substantially free of liquid.

In some implementations, the feed blocks may comprise from about 50 percent liquid to about 85 percent liquid after soaking in liquid for about 10 to about 20 minutes. For example, the initial weight of the feed block may be 2.0 pounds, and the weight of the feed block after introducing liquid may be about 4 pounds to about 14 pounds. In a preferred embodiment, 10 pounds water is added per 2 pound feed block, or water may account for about 83% of the weight of the hydrated feed block.

In feeding applications, just prior to offering the feed block to the livestock animal, liquid may be introduced to the feed block through absorption. The feed block and the absorbed liquid may thereafter be ingested by the livestock animal thus providing a water delivery system through the feeding block. Livestock animals that may ingest the feed blocks may include but are not limited to cows, horses, pigs, sheep, goats and show animals. The implementations provided herein may also be applicable to other animals such as deer.

One or more feed blocks may be provided as all or a portion of the daily ration for a livestock animal. Where multiple feed blocks are provided, the feed blocks may have the same feed composition or the feed compositions may vary. For example, the animal may be provided with 100 percent alfalfa hay feed blocks as well as 50 percent alfalfa hay and 50 percent grain mixture feed blocks. In another example, the animal may be provided with only 50 percent alfalfa hay and 50 percent grain mixture feed blocks.

In some implementations, electrolytes may be included with the feed components prior to forming the feed blocks. For example, at the time of introducing the feed components into the press interior, electrolytes in liquid or powder form may be added. In addition or alternatively, electrolytes may be added to the feed block for hydration of the feed block. In addition to providing electrolyte balancing functions, the electrolytes may improve the palatability of the feed block, which may be useful when providing the feed blocks to livestock animals that are under stress or are unhealthy.

In some implementations, feed blocks may be used for choke prevention, which may involve mixing feed pellets with the soaked feed block or including the pellets or other grains in the feed blocks so that the livestock animal slows their rate of feeding.

In some implementations, the feed blocks may serve as a liquid delivery system. By providing the livestock animals with feed blocks having liquid absorbed therein, the livestock animal may simultaneously be provided with feed and liquid in environments where liquid may otherwise spill, such as in moving trailers. This may be useful when livestock animals are transported along with water from their normal habitat. The transported water may be absorbed in the feed block and provided to the animals without the risk of water loss, and thus feed or water refusal for the fussy livestock animal.

The implementations may be understood in the context of the following examples, which one skilled in the art will realize are illustrative and non-limiting.

Example 1

Using a RUF press, blocks weighing about 2 lbs. (from about 900 grams to about 980 grams) were formed by running the press at 265 bar ram pressure. Blocks were packaged with twelve blocks per each shrink wrapped unit. Units were stacked 15 per layer 5 layers high on pallets.

The blocks were composed of alfalfa hay (ground in a tub grinder on a ¾" screen with a beater bar), oats, cracked corn, a feed pellet with a grain mixture and molasses, and a supplemental formula of vegetable oils, flax seed and rice bran, vitamins, minerals and amino acids.

Table 1 illustrates the rations A-E of the feed blocks:

TABLE 1

|  | Ration | | | | |
|---|---|---|---|---|---|
| Components | A | B | C | D* | E* |
| Alfalfa Hay | 100 | 75 | 50 | 75 | 75 |
| Grain mixture |  | 25 | 50 |  |  |
| Oats |  |  |  | 15 | 7.3 |
| Cracked corn |  |  |  | 7.8 | 4.7 |
| Supplemental Formula |  |  |  | 2.2 | 13 |

*no molasses

The compositions of each of rations A-E enabled feed blocks to be formed. Ration E, with 13 percent of the supplemental formula, included oil spots due to high vegetable oil content. Ration C, with molasses in the grain mixture, caused binding in the press due to molasses build up in the area where the die moved from one ram to the other. It is believed that a feed block of the alfalfa hay and grain mixture with less molasses may be reduce or prevent binding in the press.

Moisture content of the components after formation of the feed blocks were, 7 percent moisture in alfalfa hay; 12 percent moisture in the grain mixture, 15 percent moisture in the oats; 12 percent moisture in the cracked corn; and 5 percent moisture in the supplemental formula. The moisture content of the feed block was 7 percent for ration A, 8.25 percent for ration B, 9.5 percent for ration C, 8.6 percent for ration D and 7.6 percent for ration E.

The first example illustrates the various ration compositions that may be used to form the feed blocks provided herein and the moisture content of each of the components and the various feed blocks.

Example 2

Hay blocks were formed using the same press as in Example 1. The alfalfa hay in Example 2 was ground on a ⅝" screen. Otherwise, the composition of the feed blocks was the same as rations A-E in Example 1 and had the same moisture content. The feed blocks formed of the alfalfa hay particles were water resistant and did not soften appreciably after immersion in water for two hours.

Example 3

Hay blocks were formed using the same press as in Example 1 under a blocking pressures of 300 bar in the main ram.

Table 2 illustrates the rations A-C of the feed blocks:

TABLE 2

|  | Ration | | |
|---|---|---|---|
| Components | A | B | C |
| Alfalfa Hay | 100 |  | 50 |
| Timothy Hay |  | 100 | 50 |

Each of the feed blocks of rations A-C blocked reasonably well, but the alfalfa blocks (ration A) comparatively produced the best block and the Timothy blocks (ration B) the poorest. The alfalfa blocks retained their shape the best out of the RUF press. The Timothy blocks tended to swell out of the press and did not have as clean and smooth sides as the alfalfa blocks, which may be due to an initially high moisture content within the Timothy hay.

A feed block from each of rations A-C was soaked in water. The feed block from ration A stayed hard for at least one hour. The feed block from ration B absorbed water and fell apart quickly. The feed block from ration C fell apart almost as fast as the feed block from ration B.

During handling, some of the feed blocks from ration B fell apart on an internal break plane that was wavy not smooth. This may be due to the piston stroke length of the precharger.

Example 4

Hay blocks were formed using the same press as in Example 1. The blocks were composed of alfalfa hay and Timothy hay, and some blocks included a grain mixture without molasses. Table 3 illustrates the rations A-F of the feed blocks:

TABLE 3

|  | Ration | | | | | |
|---|---|---|---|---|---|---|
| Components | A | B | C | D | E | F |
| Alfalfa Hay | 50 | 40 | 30 | 40 | 32 | 24 |
| Timothy Hay | 50 | 60 | 70 | 40 | 48 | 56 |
| Grain mixture |  |  |  | 20 | 20 | 20 |
| Moisture (%) | 9.21 | 10.02 | 8.63* | 10.46 | 11.81 | 10.73 |

*The moisture assay of block C was initially too high to be accurate. 8.63% is the moisture content of a sample taken about five weeks later. Drying during storage may account for some of the lower moisture Each of the feed blocks of rations A-F made good blocks that did not have excessive swelling after coming out of the press. This may have been due to the formulations, but may also be due to an initially lower moisture content of the feed components of about 12 percent.

The feed blocks of each of rations A-F were subjected to a water absorption test in which the feed blocks were weighed prior to immersion in water and after immersion in water for a predefined period of time. The blocks were immersed in an amount of water four times the weight of each block. Blocks were turned over at 30 seconds and 5 minutes. At 10 minutes, the free water was poured off, weighed and returned to the container. At 15 minutes, the strength of the blocks was checked to see if they could be broken apart by hand. Table 4 illustrates the degree of breakage of the blocks of rations A-F after being immersed in water for 15 minutes:

TABLE 4

| Ration | Comment |
|---|---|
| A | ⅔ still solid |
| B | Slightly over ½ solid |
| C | Slightly over ½ solid |
| D | Small dry area in center |
| E | Mostly loose, small dry area |
| F | Mostly loose, very small dry area |

After 20 minutes, the water was again poured off, weighed and returned to the container. For each weighing, the block with ration F was weighed and subsequent feed blocks were weighed in reverse alphabetical order. The time for weighing all blocks took about 5 minutes, and thus the feed block composed of ration A soaked for about 5 minutes longer than ration F.

Table 5 illustrates the initial weight feed blocks of rations A-F, the amount of water added, and the free water remaining after 10 minutes and 20 minutes.

TABLE 5

|  | Ration | | | | | |
| --- | --- | --- | --- | --- | --- | --- |
|  | A | B | C | D | E | F |
| Block weight, g | 875.6 | 837.9 | 917.0 | 917.5 | 961.6 | 957.2 |
| Water added, g | 3502 | 3352 | 3668 | 3670 | 3846 | 3828 |
| Free water 10 min, g | 2088 | 2134 | 2168 | 1632 | 1618 | 1376 |
| Free water 20 min, g | 1518 | 1150 | 710 | 548 | 332 | 558 |
| Absorbed water 20 min, g | 1984 | 2202 | 2958 | 3122 | 3514 | 3270 |
| Percent liquid in block 20 min | 69.4 | 72.5 | 76 | 77 | 79 | 77 |

In Example 4, the feed blocks including the grain mixture (rations D-F) absorbed the most water during the water absorption test. The feed blocks formed of hay only absorbed relatively more water with increasing amounts of Timothy hay. While the feed block with ration A soaked in water for the longest period of time, the feed block absorbed the least amount of water after 20 minutes. In some implementations, feed blocks with between about 45 to about 60 percent Timothy hay, about 20 percent grains and the balance alfalfa hay may be preferred for its water absorption properties. In each feed block type in Table 5, the amount of liquid absorbed exceeded 200 percent of the initial, pre-immersed weight of the feed block. For example, ration A absorbed an amount of liquid equivalent to 227 percent of the original weight of the feed block. After 20 minutes, the feed blocks comprised from about 69 percent liquid to about 80 percent liquid.

A variety of feed blocks may be provided based on the dietary needs of the livestock animal, the preference of the livestock animal, the availability of feed components, and so on, and the compositions listed above should not be viewed as limiting. In addition, the feed blocks may absorb more or less water than the amounts provided in Table 5. For example, as discussed above, the feed blocks with an initial weight of 2 pounds may absorb 10 pounds of water and may account for 83.3 percent of the total weight of the hydrated feed block.

Example 5

This example demonstrates the acceptability of feed blocks when used as a carrier for supplements such as orally-ingestible vitamins, health-aids, and medications. The intake of hydrated feed blocks is evaluated when combined with different topdress supplements. The feed block products may be used as a carrier to ensure consumption of supplements in horses, that may otherwise not be eaten. Traditional methods of topdressing feeds are not always effective, as horses sort medications and supplements out of feed and these items also naturally separate out from feed due to differing particle sizes, e.g., the additives may settle out of the topdressed feeds.

Accordingly, to test whether the hydrated feed blocks provide a more suitable carrier for supplements, six horses received hydrated feed block feedings before standard feeding. Blocks were hydrated at a rate of 5 parts water to 1 part block (e.g., 10 pounds water to 2 pounds of block). The hay blocks containing a 50/50 mix of timothy and alfalfa were used for the hay portion, but each of the feed blocks provided herein may provide a suitable carrier supplement. The feed blocks were soaked for 1 hour and the supplement was added and mixed into the hydrated hay. The additive types included joint supplements such as powdered form Cosequin®; antacids such as equine antacids including 4 ounces powder-ground Neigh-Lox®; antibiotics such as ground tablets of sulfa (e.g., sulfamethoxazole (SMZ)); electrolytes such as equine electrolytes including 2 ounces of Apple Dex™; and non-steroidal anti-inflammatory drugs (NSAID) such as 1 gram dose of ground phenylbutazone tabs. In some implementations, the supplement types may be rotated each day to avoid over-supplementation and potential acclimation issues. However, supplements may be combined in a single feed block feeding.

The horses were offered the full 12 pounds of hydrated block/additive mixture to evaluate potential to consume the entire offering. Hay consumed and unconsumed was recorded and approximate amount of time to consume was measured.

Overall, horses were receptive to the treatments, with 100 percent of the horses consuming the feed blocks including with joint supplements (e.g., Cosequin tabs) and equine antacid (e.g., Neigh-Lox®). All of these treatments were consumed within 20-75 minutes, with the average for the joint supplement treatment at 30 minutes, SMZ at 28 minutes and equine antacid at 45 minutes. For the electrolyte treatment, 89 percent of the horses consumed 100 percent of the treatment. One horse consumed the majority, but not all of the treatment at 135+ minutes after the combination was offered. Otherwise, horses consumed the hay electrolyte mixture in 27-135 minutes, with a mean consumption time of 70 minutes. For the NSAID treatment (e.g., phenylbutazone tabs), 83 percent of the horses consumed 100 percent of the treatment. At two time points, two horses consumed the majority, but not all of the NSAID treatment, with product still left after 130 minutes. One horse at one time point consumed little of the treatment, with the majority of the treatment left at 130 minutes post offering. Of the horses consuming 100 percent of treatment, the mean consumption time was 37 minutes.

In view of the foregoing results, hydrated feed blocks may provide a large volume of wet feedstuff in which supplements may be suspended in for improved consumption by the horse. This may lessen the chances of the livestock animal sorting out the supplements from the feed and may facilitate preventing separation or settling of the supplements from the feed (e.g., due to differing particle sizes). While the feed blocks may be hydrated and then topdressed with the additives, feed blocks may also be formed in the RUF press with the additives incorporated therein. Such feed blocks may be provided to the livestock animal in a hydrated form or additional supplements may be topdressed prior to offering the hydrated, supplemented feed blocks.

Although the present disclosure provides references to preferred embodiments, persons skilled in the art will recognize that changes may be made in form and detail without departing from the spirit and scope of the invention.

What is claimed is:

1. A method of feeding a feed block to one or more livestock animals, comprising:
    obtaining a feed block comprising at least one compacted feed component, the at least one compacted feed component comprising ground hay at a level of at least about 50 percent of an initial weight of the feed block, wherein in an initial state, the feed block is substantially free of liquid;

introducing liquid to the feed block during a treatment period such that the feed block absorbs the liquid, the at least one compacted feed component separates and the feed block breaks apart, wherein a final weight of the feed block is at least 100 percent greater than the initial weight; and providing the feed block with the absorbed liquid to the one or more livestock animals after the treatment period.

2. The method of claim 1, wherein the liquid comprises one or more of water and electrolytes.

3. The method of claim 1, wherein the final weight of the feed block comprises at least 50 percent liquid.

4. The method of claim 1, wherein the final weight of the feed block comprises between about 50 percent and 85 percent liquid.

5. The method of claim 1, wherein in the initial state, the feed block comprises a moisture level of between about 7 and about 15 percent.

6. The method of claim 1, wherein the final weight of the feed block is between about 300 percent and 500 percent greater than the initial weight.

7. The method of claim 1, wherein the final weight of the feed block is about 500 percent greater than the initial weight.

8. The method of claim 1, wherein the final weight of the feed block comprises a weight of the feed block after absorbing liquid for between about 10 minutes and about 20 minutes.

9. The method of claim 1, further comprising topdressing the feed block comprising the absorbed liquid with one or more supplements.

10. The method of claim 9, wherein the topdressed supplements comprise one or more of joint supplements, antacids, antibiotics, electrolytes, and non-steroidal anti-inflammatory drugs.

11. The method of claim 1, wherein the treatment period is from about 10 minutes to about 20 minutes.

12. The method of claim 1, wherein the treatment period is up to about 10 minutes.

13. The method of claim 1, wherein the compacted feed component further comprises one or more of corn, wheat, milo, soybean meal, grain mixtures, molasses, electrolytes, flavorings, supplements or vitamins.

14. The method of claim 1, wherein the ground hay forms up to 80 percent of the initial weight of the feed block.

* * * * *